United States Patent [19]
Bux et al.

[11] Patent Number: 5,195,369
[45] Date of Patent: Mar. 23, 1993

[54] APPARATUS FOR DETERMINING THE UNBALANCE OF WHEELS MOUNTED ON A VEHICLE

[75] Inventors: Hermann Bux, Poecking-Possenhofen; Peter Ross, Munich, both of Fed. Rep. of Germany

[73] Assignee: A. Rohe GmbH, Schollkrippen, Fed. Rep. of Germany

[21] Appl. No.: 855,485

[22] Filed: Mar. 23, 1992

Related U.S. Application Data

[63] Continuation of Ser. No. 396,030, Aug. 21, 1989, abandoned.

[30] Foreign Application Priority Data

Aug. 23, 1988 [DE] Fed. Rep. of Germany ....... 3828610

[51] Int. Cl.$^5$ ............................................. G01M 1/28
[52] U.S. Cl. .................................. 73/457; 340/870.16
[58] Field of Search .............................. 73/457, 458; 340/870.11, 870.16, 870.28

[56] References Cited

U.S. PATENT DOCUMENTS 4,738,133  4/1988  Breckel et al. ................. 340/870.28

FOREIGN PATENT DOCUMENTS 0007741  2/1980  European Pat. Off. .
0201969  11/1986 European Pat. Off. .
2223159  11/1973 Fed. Rep. of Germany .
WO87/5999 10/1987 World Int. Prop. O. ............ 73/457

Primary Examiner—John E. Chapman
Attorney, Agent, or Firm—Jacobson, Price, Holman & Stern

[57] ABSTRACT

An apparatus for determining the unbalance of wheels mounted on a vehicle comprises at least one measuring rack for supporting a vehicle wheel, a sensor provided in the measuring rack for sensing vibrations caused by the unbalance and for issuing a sensor signal. A measurement/control unit generates unbalance signals from the source signals which represent the unbalance with respect to magnitude and direction. At least the unbalance magnitude is displayed at a display unit. A wireless signal transmission unit is disposed in the path between the sensor and the display unit. A central display and control unit is provided for several measuring racks, the measuring racks and the display control unit comprising a transmitter/receiver for signal transmission. Thus signals are transmitted from the measuring racks to the display control unit and control signals are transmitted from the display control unit to the measuring racks.

59 Claims, 3 Drawing Sheets

APPARATUS FOR DETERMINING THE UNBALANCE OF WHEELS MOUNTED ON A VEHICLE

This application is a continuation-in-part, of application Ser. No. 396,030, filed Aug. 21, 1989, now abandoned.

BACKGROUND OF THE INVENTION

The present invention relates to an apparatus for determining the unbalance of wheels mounted on a vehicle, comprising at least one measuring rack for supporting a vehicle wheel, a sensor provided at the measuring rack for recording the vibrations caused by the unbalance and issuing a sensor signal, a measurement/control means for generating unbalance signals from the sensor signals which unbalance signals represent the unbalance with respect to magnitude and direction, a display means for displaying at least the unbalance magnitude and a wireless signal transmission means disposed in the path between the sensor and the display means.

In a known apparatus, measurement signals are transmitted from the measuring rack to a display means which is included in the device used for driving the wheel. This apparatus has, however, turned out to be not functional and is not suited for effecting the balancing operation on the vehicle if such vehicle has a permanent all-wheel drive.

SUMMARY OF THE INVENTION

It is an object of the present invention to provide an apparatus for determining the unbalance of wheels mounted on a vehicle, wherein the measuring operations at the individual wheels may be effected quickly without changing the location of the equipment or the service staff.

It is a further object of the present invention to provide an apparatus for determining the unbalance of wheels mounted on a vehicle, wherein the measuring operations may be performed easily minimizing movement of bulky objects.

The apparatus according to the present invention comprises a central display and control unit servicing several measuring racks. Each measuring rack and display control means comprises transmitter/receiver means for transmitting signals from the measuring racks to the display control means and control signals from the display control means can be transmitted to the measuring racks.

By virtue of the central display and control unit, it is possible to interrogate the unbalance measurement signals from the measuring racks as well as to forward control signals to the measuring racks while the central display and control unit remains in one and the same place, and preferably in the hand of the service person sitting in the vehicle.

The measuring process is simplified in that the measured values of the individual wheels can be interrogated subsequently.

According to a further embodiment of the invention, the transmitter/receiver means at the measuring racks are arranged so that the measurement and control signals can be transmitted through each of the measuring racks to other measuring racks. It is therefore possible to transmit the measurement and control signals between the measuring racks and the display control means as soon as one transmission path exists from the display control means to one of the measuring racks. Thus the relative position of the display control means can be arbitrarily chosen within a great range without creating problems such as those associated with the transmission shadow area.

According to a further embodiment of the present invention, the transmitter/receiver means comprises infrared transmitters and receivers. The transmitters radiate multi-directionally. At each measuring rack, two or more transmitters and receivers are disposed. Infrared frequencies are chosen to avoid radio frequencies disturbances with other measuring instruments.

A further embodiment of the present invention comprises the measuring/control means being located in the measuring rack and the transmitter/receiver means being disposed between the measuring/control means and the display control means. When the measuring portion as well as the control portion of the measuring-/control means are located in the measuring rack, it is possible to transmit the control signals as well as the measurement signals scanned at the measuring rack through one transmission path.

According to yet a further embodiment of the apparatus according to the present invention, comprises a scanning means including a transmitter and a receiver for scanning a marking on the wheel, for issuing a speed signal representing the speed of the wheel when the wheel is driven. The scanning means is positioned at the measuring rack with its side facing the wheel and the transmitter and the receiver of the scanning means are operated at a different frequency for signal transmission than the transmitter/receiver means. In this case, the scanning means is preferably located opposite to the tread of the wheel in case of a measuring rack being arranged at the wheel, wherein a marking located on the tread of the wheel can be scanned. As a result, the unbalance signals for the magnitude and the direction of the unbalance as well as the speed signals and the control signals can be transmitted through the same transmission path.

A further embodiment according to the present invention comprises a first identification modulator/demodulator provided in the measuring/control means in the measuring rack and a second identification modulator/demodulator provided in the display control means for correlating the signals transmitted between the measuring/control means in the measuring racks and the display control means to a particular measuring rack and/or wheel, respectively by means of an identification set. This substantially facilitates the handling of the apparatus, as all measurement units can work simultaneously and the measured values can be subsequently interrogated using the identification information.

A further embodiment according to the present invention comprises change-over means provided in the display control means and in the measuring/control means of the measuring racks for switching the identification modulators/demodulators to additional identification sets. Thereby, disturbances are avoided if two vehicles are measured side by side at the same time.

Further embodiments according to the present invention include a display control means comprising a flexible light guide and a lens terminating the guide or a display control means which comprises a line terminated by a transmitter/receiver unit. Thereby, the transmission/receiving level is shifted to a level below the vehicle frame so that the service person can sit inside the vehicle without impairing the signal transmission by transmission shadow areas.

DETAILED DESCRIPTION OF THE DRAWINGS

Figure 1:
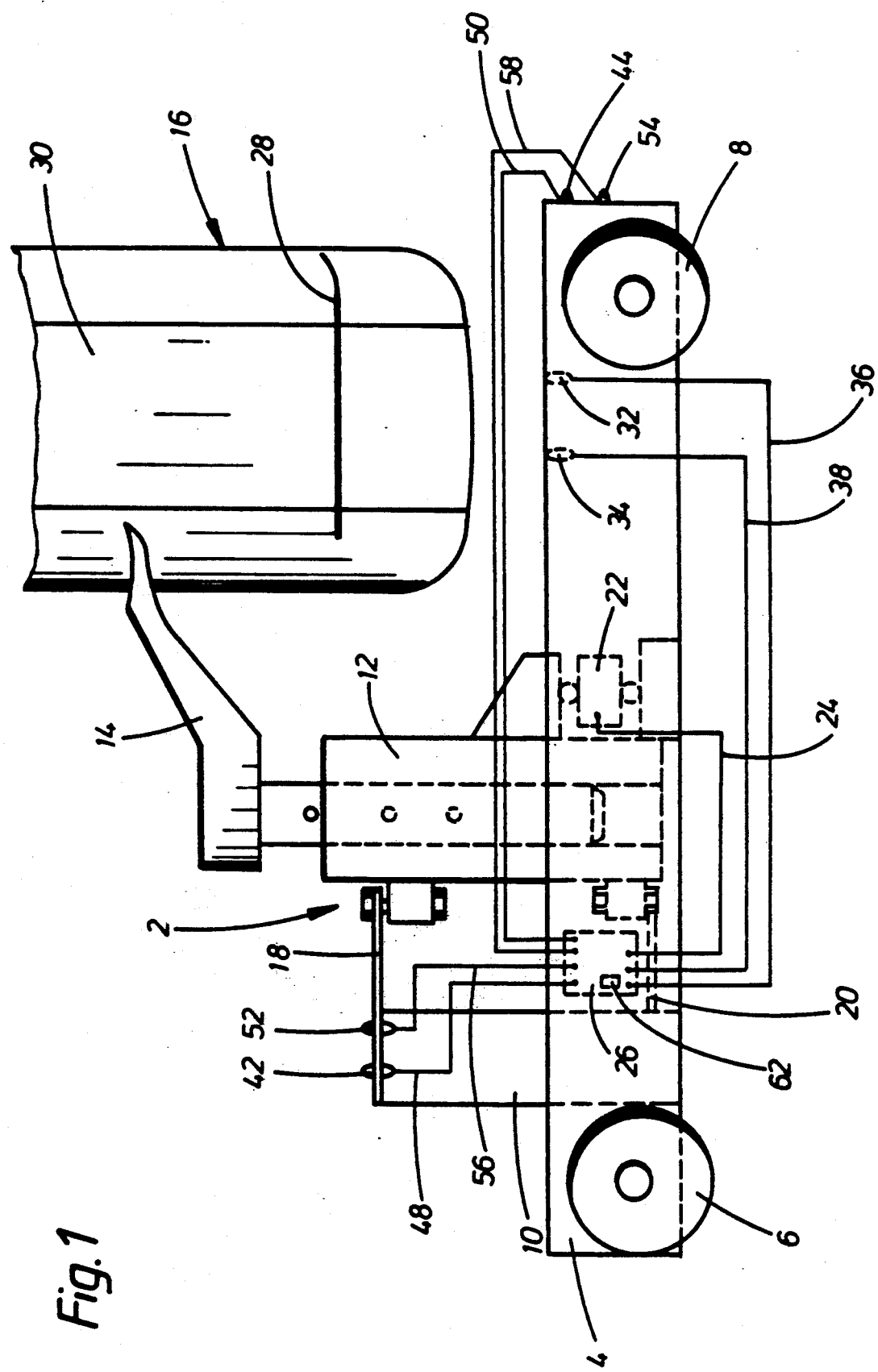
FIG. 1 is a side view of a measuring rack according to the present invention.
Figure 2:
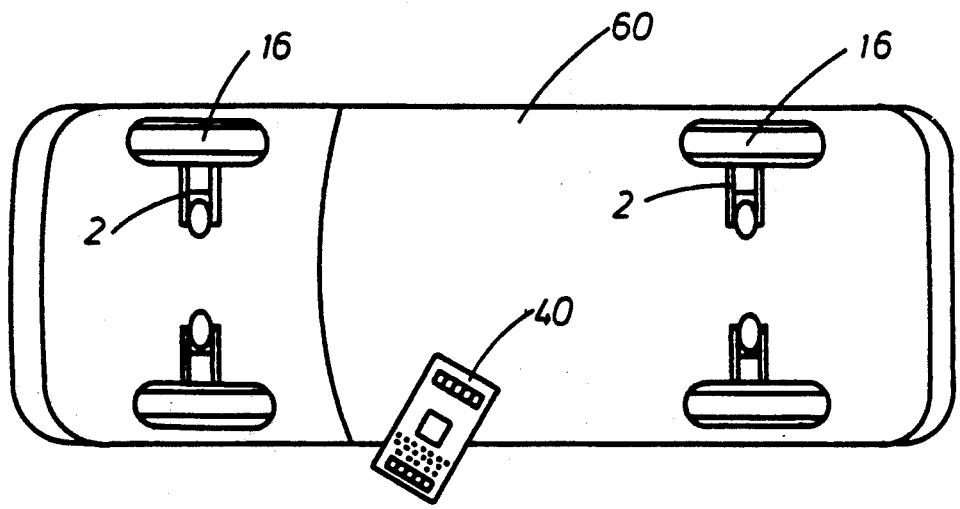
FIG. 2 is a schematic view of a vehicle with measuring racks supporting the four wheels and associated with a display control unit.

FIG. 1 shows a measuring rack 2 comprising a stand 4 with wheels 6 and 8. A pick-up crown 14 is arranged on the stand 4 by means of a column 10 and a support column 12. The crown 14 lifts the vehicle wheel 16 to support the wheel at a desired height. The column 10 is connected to the column 12 through two girders 18 and 20 and a sensor 22, for example a piezoelectric force sensor, is located between the support column 12 and the stand 4. With this arrangement the vibrations caused by the unbalance of the vehicle wheel 16 are sensed by the sensor 22 which in response issues sensor signals to a measuring/control unit 26 through a line 24. For detecting the direction of the unbalance and the speed of the driven vehicle wheel 16, a marking 28 is provided on the tread 30 of the vehicle wheel 16, such marking being scanned by means of a transmitter 32 and a receiver 34 disposed at the side of the stand 4 opposite to the tread 30. The transmitter 32 is connected to the measuring/control unit 26 through a line 36 and the receiver 34 is connected thereto by means of a line 38. In a manner known in the art, the measuring/control unit 26 generates signals corresponding to the magnitude of the unbalance and the direction thereof and of the speed of the wheel 16 from the signals generated by the sensor 22 and the receiver 34 and in wireless manner transmits the corresponding signals to a display control unit 40 (FIG. 2). The infrared frequency range is preferred for such transmission. In this case multidirectional radiating transmitters are used, comprising several transmitting diodes being arranged in a circle and emitting radiation radially outward. Two such transmitters 42 and 44 are provided in the measuring rack 2 of FIG. 1, transmitter 42 of which being disposed on the side of the column 12 not facing the wheel 16 and transmitters 44 being disposed on the face 46 pointing to the outside of the stand 4. The transmitter 42 is connected to the measuring/control unit 26 through a line 48 and the transmitter 44 is connected thereto through a line 50. The measuring/control unit 26 also receives control signals from the display control means 40 through a receiver 52 and/or a receiver 54, the two receivers 52 and 54 being connected to the measuring/control unit 26 by lines 56 and/or 58, respectively. Because several transmitters/receivers are arranged at one measuring rack 2 for transmitting the signals between the measuring/control unit and the display control unit in a distributed manner, safe transmission of the signals is also guaranteed, even if the direct transmission path between one transmitter/receiver pair is interrupted, e.g. by a wheel.

FIG. 2 schematically illustrates a vehicle 60 with four wheels 16 and four measuring racks 2, each of which being arranged under a wheel, in order that the wheel balance of a vehicle with permanent all-wheel drive can be measured. The main display and control unit 40 is provided for all four measuring racks. The measuring racks 2 as well as the display control unit have transmitters and receivers for signal transmission, the signals being transmittable from the measuring racks 2 to the display control unit 40 and control signals being transmittable from the display control unit 40 to the measuring racks 2 and/or to the measuring/control unit, respectively, arranged in the measuring racks. To permit correlation of the signals transmitted between the measuring racks and the display control unit 40 with respect to a certain measuring rack and/or wheel, respectively, identification modulators/demodulators are disposed in the display control unit 40 and in the measuring/control unit 26 of the measuring racks 2. An identification modulator/demodulator located in a measuring rack can be adjusted to one identification characteristic for one particular wheel, such identification then being recognized by the identification modulator/demodulator in the display control unit 40. A keyboard 62 is provided, shown schematically in FIG. 1, for remotely adjusting the identification in each measuring rack, if desired. The keyboard 62, e.g., has four keys for "measuring rack located left-hand side, front", "measuring rack located right-hand side, front", "measuring rack located left-hand side, rear" and/or "measuring rack located right-hand side, rear". If two vehicles are standing side by side and are to be measured at the same time, a further identification set can be allotted to the second vehicle. For this purpose changeover means for switching to further identification sets are provided in the display control unit and in the measuring/control unit.

Figure 3:
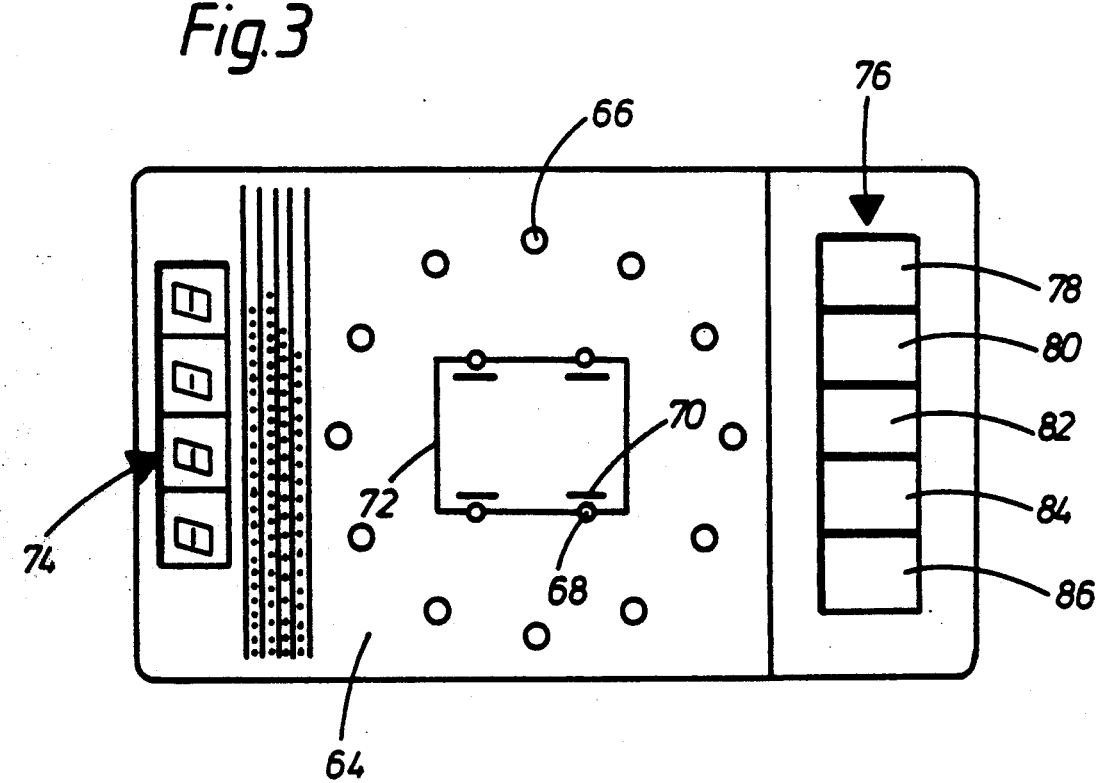
FIG. 3 is a top view of the display control unit according to the present invention.

According to FIG. 3 the display control unit 40 comprises an LCD-field 64. The points 66 arranged in the manner of a clockface indicate the direction of the unbalance with respect to a reference point. The points 68 in which schematically markings 70 for the wheels of the vehicle and a schematical display 72 representing the vehicle 62 are shown, indicate which wheel is measured presently. A numerical display 74 serves for displaying the magnitude of the unbalance and/or the speed of the wheel, respectively. A bank of keys 76 comprises a key 78 for starting/stopping the measurement operation, a key 80 for change-over from gram to ounce display, a key 82 for interrogating the wheel speed, a key 84 for interrogating the unbalance data as to magnitude and direction and a key 86 for activating the change-over means for switching over to another identification set.

Figure 4:
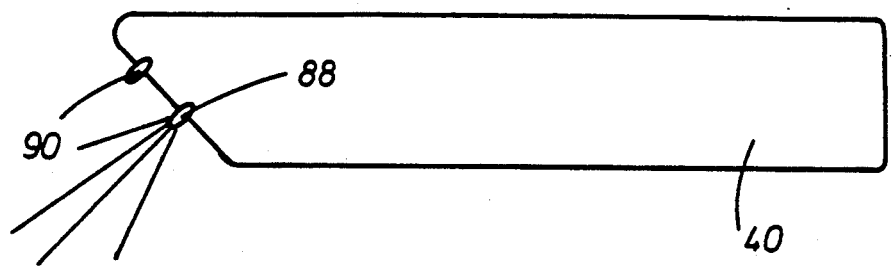
FIG. 4 is a side view of the display control unit according to a first embodiment of the present invention.
Figure 5:
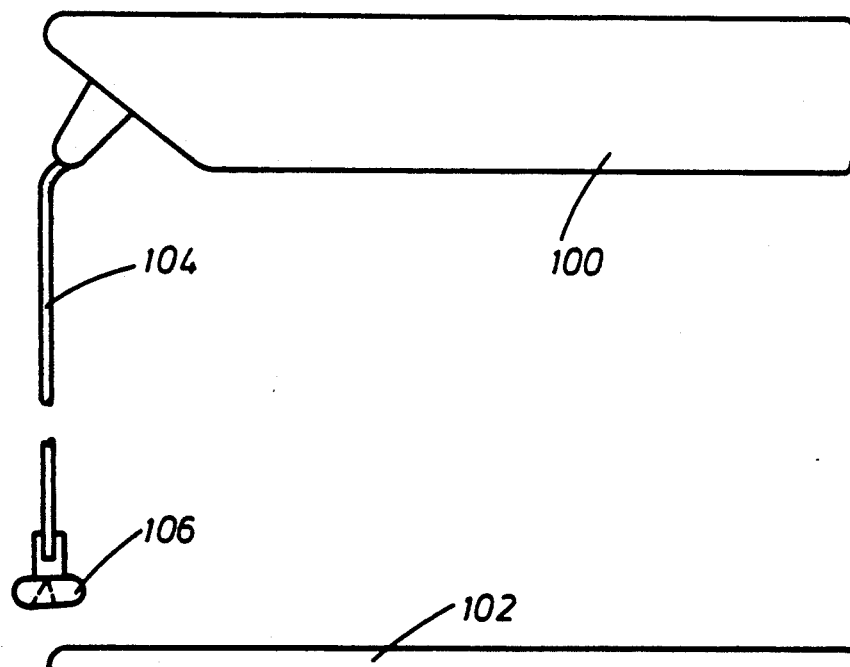
FIG. 5 is a side view of the display control unit according to a second embodiment of the present invention.
Figure 6:
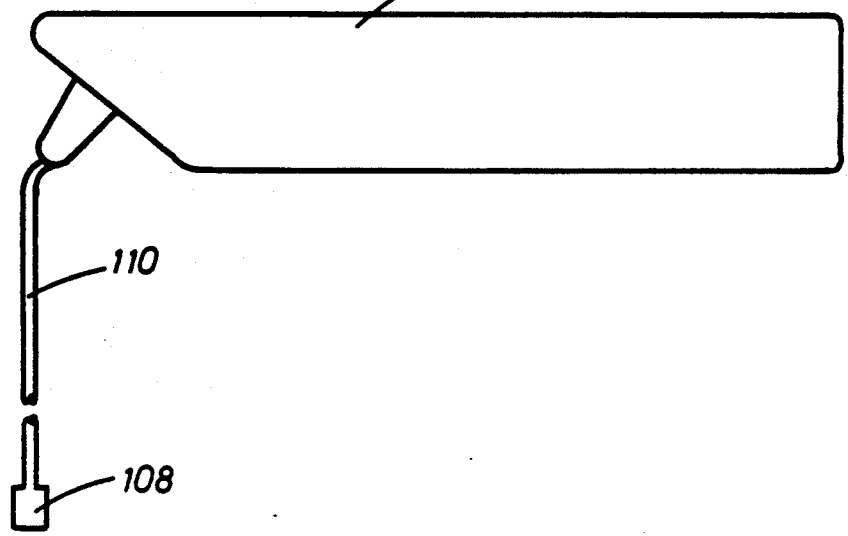
FIG. 6 is a side view of the display control unit according to a third embodiment of the present invention.

FIG. 4 shows schematically the way in which a transmitter 88 and a receiver 90 are arranged at a chamfered face wall in the display control unit 40. The transmitter and receiver are orientated in an oblique downward direction so that a transmission path between the display control unit 50 and the transmitters/receivers in the measuring racks 2 is created when the display control unit 40 is held out of the window of the vehicle or is directed to the measuring racks laterally from the vehicle. For simplifying the handling it si provided in display control unit 100 (FIG. 5) and/or 102 (FIG. 6), respectively, that the point in which signals are issued and/or received by the display control unit is shifted to a plane below the vehicle frame. For this purpose the transmitter/receiver is located within the display control unit 100 and the signals are forwarded by the transmitter through a light guide 104 and a lens 106 and/or received through the lens 106 and forwarded to the light guide 104 to the receiver. In the display control unit 102 the transmitter/receiver unit 108 is located at the end of an electrical line 110.

The above description with respect to the drawings refers to the measurement of a vehicle with permanent all-wheel drive. In other cases when separate driving units are provided for driving the wheels, such driving units can receive respective control signals through the display control means for starting or stopping, accelerating or braking down the drive.

What is claimed is:

1. An apparatus for determining the unbalance of wheels mounted on a vehicle, comprising:
   a plurality of measuring racks each for supporting a vehicle wheel;
   sensor means provided in each of said measuring racks for sensing vibrations caused by the unbalance and for issuing a sensor signal representative thereof;
   measurement/control means associated with each measuring rack for generating measurement unbalance signals representing the magnitude and direction of unbalance from said sensor signals;
   the sensor means and measurement/control means at each measuring rack being responsive to and controlled by control signals;
   a central display and control unit cooperating with said plurality of measuring racks and including display means for displaying at least the magnitude of unbalance, said central display and control unit generating said control signals for controlling the operation of the sensor means and measurement/control means of each measuring rack to control the unbalance testing at each measuring rack;
   each of said measuring racks and said central display and control unit comprising transmitter/receiver means for wireless signal transmission in the path between each of said measuring racks and said central display and control unit, whereby said measurement signals are transmitted from said measuring racks to said central display and control unit and control signals from said central display and control unit to each of said measuring racks; and
   wherein said transmitter/receiver means at each of said measuring racks are arranged with respect to each other so that the measurement and control signals can be transmitted between measuring racks.

2. An apparatus as defined in claim 1, wherein said transmitter/receiver means comprises infrared transmitters.

3. An apparatus as defined in claim 1, wherein several transmitter/receivers means are arranged in one measuring rack.

4. An apparatus as defined in claim 1, wherein said transmitter/receiver means comprise multidirectional radiating receivers and transmitters.

5. An apparatus as defined in claim 1, and further comprising scanning means provided on each measuring rack including a scanning transmitter and a scanning receiver, a marking on each wheel being measured is provided which is scanned by the scanning means for issuing a speed signal representing the speed of the wheel when the wheel is driven, wherein said scanning means is arranged on each measuring rack and facing the wheel and said scanning transmitter and said scanning receiver of said scanning means being operated at a frequency for signal transmission different than that of said transmitter/receiver means.

6. An apparatus as defined in claim 5, wherein said scanning means is located on each measuring rack opposite to a tread of the wheel, said marking being located on the tread of the wheel can be scanned, when said measuring rack is arranged at the wheel.

7. An apparatus as defined in claim 1, wherein a first identification modulator/control means in each of said measuring racks and a second identification modulator/demodulator is provided in said central display and control unit for correlating said measurement signals transmitted between said measuring racks and said central display and control unit to a particular measuring rack at a particular wheel by means of an identification set.

8. An apparatus as defined in claim 7, wherein said first identification modulator/demodulator in each measuring rack can be adjusted to an identification which is characteristic of a particular wheel.

9. An apparatus as defined in claim 8, wherein a keyboard means is provided for adjusting the identification set of said particular wheel.

10. An apparatus as defined in claim 7, wherein change-over means are provided in said central display and control unit and in said measurement/control means of said measuring racks for switching to new identification sets in said first and second identification modulators/demodulators.

11. An apparatus as defined in claim 1, wherein said transmitter/receiver means of said central display and control unit is connected to a flexible light guide at the end of which a lens is located for communicating with said transmitter/receiver means of said measuring racks.

12. An apparatus as defined in claim 1, wherein said central display and control unit is connected by an electrical connection line to a transmitter/receiver unit for communicating with said transmitter/receiver means of said measuring racks.

13. A system for measuring the unbalance of the wheels of a vehicle, each of said measuring racks comprising:
   a plurality of measuring racks for supporting each of the wheels of a vehicle, each of said measuring racks comprising:
   sensor means for sensing vibrations caused by the unbalance of a wheel and issuing a sensor signal responsive thereto;
   measurement/control means for generating measurement signals representative of the magnitude and direction of unbalance of the corresponding wheel in accordance with the sensor signal from the corresponding sensor;
   the sensor means and measurement/control means at each measuring rack being responsive to and controlled by control signals; and
   measuring rack transceiver means for transmitting over a wireless link said measurement signals; and
   central display and control unit generating said control signals for controlling the operation of said sensor means and said measurement/control means in each of said plurality of measuring racks to control the unbalance testing procedure of each measuring rack, said central display and control unit comprising:
display means for displaying at least the magnitude of unbalance of each of the wheels at each of the measuring racks;
control transceiver means for transmitting over a wireless link said control signals to the measuring rack transceiver means and for receiving said measurement signals transmitted by said measuring rack transceiver means; and
wherein the measuring rack transceiver means of each of said measuring racks are arranged so that the measurement and control signals can be transmitted between measuring racks.

14. The system of claim 13, wherein each of said measuring rack transceiver means and said control transceiver means comprise infrared transmitters and infrared receivers.

15. The system of claim 13, wherein each of said measuring rack transceiver means and said control transceiver means comprise multidirectional radiation receivers and transmitters.

16. The system of claim 13, wherein each of said measuring racks comprises scanning means including a scanning transmitter and a scanning transceiver, a marking being provided on each wheel which is scanned by said scanning means for generating a speed signal representing the speed of the wheel while the wheel is being driven.

17. The system of claim 16, wherein said scanning means is located on each measuring rack opposite to a tread of the wheel, said marking being located on the tread of the wheel.

18. The system of claim 1, wherein said measurement/control means comprises a first identification modulator/demodulator and said central display and control unit comprises a second identification modulator/demodulator, said first and second identification modulator/demodulators correlating said measurement signals transmitted between said measuring racks and said central display and control unit to an identification set of a particular measuring rack.

19. The system of claim 18, wherein said first identification modulator/demodulator is adjusted to said identification set which is characteristic of a particular wheel corresponding to said particular measuring rack.

20. The system of claim 19, and further comprising a keyboard at said central display and control unit for adjusting the identification set of said particular measuring rack.

21. The system of claim 18, wherein said central display and control unit and said measurement/control means comprise change-over means for switching to new identification sets in said first and second identification modulators/demodulators.

22. The system of claim 13, wherein said control transceiver means of central display and control unit is connected to a flexible light guide and a lens located at an end of said flexible light guide for communicating with said measuring rack transceiver means.

23. The system of claim 13, wherein said control display and control unit is connected by an electrical connection line to a transmitter/receiver unit for communicating with said measuring rack transceiver means.

24. An apparatus for determining the unbalance of wheels mounted on a vehicle, comprising:
a plurality of measuring racks each for supporting a vehicle wheel;
sensor means provided in each of said measuring racks for sensing vibrations caused by the unbalance and for issuing a sensor signal representative thereof;
measurement/control means associated with each measuring rack for generating measurement unbalance signals representing the magnitude and direction of unbalance from said sensor signals;
the sensor means and measurement/control means at each measuring rack being responsive to and controlled by control signals;
a central display and control unit cooperating with said plurality of measuring racks and including display means for displaying at least the magnitude of unbalance, said central display and control unit generating said control signals for controlling the operation of the sensor means and measurement/control means of each measuring rack to control the unbalance testing at each measuring rack;
each of said measuring racks and said central display and control unit comprising transmitter/receiver means for wireless signal transmission in the path between each of said measuring racks and said central display and control unit, whereby said measurement signals are transmitted from said measuring racks to said central display and control unit and control signals from said central display and control unit to each of said measuring racks; and
wherein said transmitter/receiver means of said central display and control unit is connected to a flexible light guide at the end of which a lens is located for communicating with said transmitter/receiver means of said measuring racks.

25. An apparatus as defined in claim 24, wherein several transmitter/receivers means are arranged in one measuring rack.

26. An apparatus as defined in claim 24, and further comprising scanning means provided on each measuring rack including a scanning transmitter and a scanning receiver, a marking on each wheel being measured is provided which is scanned by the scanning means for issuing a speed signal representing the speed of the wheel when the wheel is driven, wherein said scanning means is arranged on each measuring rack and facing the wheel and said scanning transmitter and said scanning receiver of said scanning means being operated at a frequency for signal transmission different than that of said transmitter/receiver means.

27. An apparatus as defined in claim 26, wherein said scanning means is located on each measuring rack opposite to a tread of the wheel, said marking being located on the tread of the wheel can be scanned, when said measuring rack is arranged at the wheel.

28. An apparatus as defined in claim 24, wherein a first identification modulator/demodulator is provided in said measurement/control means in each of said measuring racks and a second identification modulator/demodulator is provided in said central display and control unit for correlating said measurement signals transmitted between said measuring racks and said central display and control unit to a particular measuring rack at a particular wheel by means of an identification set.

29. An apparatus as defined in claim 28, wherein said first identification modulator/demodulator in each measuring rack can be adjusted to an identification which is characteristic of a particular wheel.

30. An apparatus as defined in claim 29, wherein a keyboard means is provided for adjusting the identification set of said particular wheel.

31. An apparatus as defined in claim 28, wherein changeover means are provided in said central display and control unit and in said measurement/control means of said measuring racks for switching to new identification sets in said first and second identification modulators/demodulators.

32. An apparatus for determining the unbalance of wheels mounted on a vehicle, comprising:
 a plurality of measuring racks each for supporting a vehicle wheel;
 sensor means provided in each of said measuring racks for sensing vibrations caused by the unbalance and for issuing a sensor signal representative thereof;
 measurement/control means associated with each measuring rack for generating measurement unbalance signals representing the magnitude and direction of unbalance from said sensor signals;
 the sensor means and measurement/control means at each measuring rack being responsive to and controlled by control signals;
 a central display and control unit cooperating with said plurality of measuring racks and including display means for displaying at least the magnitude of unbalance, said central display and control unit generating said control signals for controlling the operation of the sensor means and measurement/control means of each measuring rack to control the unbalance testing at each measuring rack;
 each of said measuring racks and said central display and control unit comprising transmitter/receiver means for wireless signal transmission in the path between each of said measuring racks and said central display and control unit, whereby said measurement signals are transmitted from said measuring racks to said central display and control unit and control signals from said central display and control unit to each of said measuring racks; and
 wherein said central display and control unit is connected to one end of an electrical connection line, an opposite end of said electrical connection line being connected to a transmitter/receiver unit of said central display and control unit, for communicating with said transmitter/receiver means of said measuring racks, whereby said transmitter/receiver unit of said central display and control unit can be located substantially level with said transmitter/receiver means of said measuring racks while said central display and control unit is not level with said transmitter/receiver means of said measuring racks.

33. An apparatus as defined in claims 32, wherein said transmitter/receiver means at each of said measuring racks are arranged with respect to each other so that the measurement and control signals can be transmitted between measuring racks.

34. An apparatus as defined in claim 32, wherein said transmitter/receiver means comprises infrared transmitters.

35. An apparatus as defined in claim 32, wherein several transmitter/receiver means are arranged in one measuring rack.

36. An apparatus as defined in claim 32, wherein said transmitter/receiver means comprise multidirectional radiating receivers and transmitters.

37. An apparatus as defined in claim 32, and further comprising scanning means provided on each measuring rack including a scanning transmitter and a scanning receiver, a marking on each wheel being measured is provided which is scanned by the scanning means for issuing a speed signal representing the speed of the wheel when the wheel is driven, wherein said scanning means is arranged on each measuring rack and facing the wheel and said scanning transmitter and said scanning receiver of said scanning means being operated at a frequency for signal transmission different than that of said transmitter/receiver means.

38. An apparatus as defined in claim 38, wherein said scanning means is located on each measuring rack opposite to a tread of the wheel, said marking being located on the tread of the wheel can be scanned, when said measuring rack is arranged at the wheel.

39. An apparatus as defined in claim 32, wherein a first identification modulator/demodulator is provided in said measurement/control means in each of said measuring racks and a second identification modulator/demodulator is provided in said central display and control unit for correlating said measurement signals transmitted between said measuring racks and said central display and control unit to a particular measuring rack at a particular wheel by means of an identification set.

40. An apparatus as defined in claim 39, wherein said first identification modulator/demodulator in each measuring rack can be adjusted to an identification which is characteristic of a particular wheel.

41. An apparatus as defined in claim 40, wherein a keyboard means is provided for adjusting the identification set of said particular wheel.

42. An apparatus as defined in claim 40, wherein changeover means are provided in said central display and control unit and in said measurement/control means of said measuring racks for switching to new identification sets in said first and second identification modulators/demodulators.

43. A system for measuring the unbalance of the wheels mounted on a vehicle comprising:
 a plurality of measuring racks for supporting each of the wheels of a vehicle, each of said measuring racks comprising:
 sensor means for sensing vibrations caused by the unbalance of a wheel and issuing a sensor signal responsive thereto;
 measurement/control means for generating measurement signals representative of the magnitude and direction of unbalance of the corresponding wheel in accordance with the sensor signal from the corresponding sensor;
 the sensor means and measurement/control means at each measuring rack being responsive to and controlled by control signals; and
 measuring rack transceiver means for transmitting over a wireless link said measurement signals; and
 central display and control unit generating said control signals for controlling the operation of said sensor means and said measurement/control means in each of said plurality of measuring racks to control the unbalance testing procedure of each measuring rack, said central display and control unit comprising:
- display means for displaying at least the magnitude of unbalance of each of the wheels at each of the measuring racks;
- control transceiver means for transmitting over a wireless link said control signals to the measuring rack transceiver means and for receiving said measurement signals transmitted by said measuring rack transceiver means; and
- wherein said control transceiver means of central display and control unit is connected to a flexible light guide and a lens located at an end of said flexible light guide for communicating with said measuring rack transceiver means.

44. The system of claim 43, wherein each of said measuring racks comprises scanning means including a scanning transmitter and a scanning transceiver, a marking being provided on each wheel which is scanned by said scanning means for generating a speed signal representing the speed of the wheel while the wheel is being driven.

45. The system of claim 44, wherein said scanning means is located on each measuring rack opposite to a tread of the wheel, said marking being located on the tread of the wheel.

46. The system of claim 43, wherein said measurement/control means comprises a first identification modulator/demodulator and said central display and control unit comprises a second identification modulator/demodulator, said first and second identification modulator/demodulators correlating said measurement signals transmitted between said measuring racks and said central display and control unit to an identification set of a particular measuring rack.

47. The system of claim 46, wherein said first identification modulator/demodulator is adjusted to said identification set which is characteristic of a particular wheel corresponding to said particular measuring rack.

48. The system of claim 47, and further comprising a keyboard at said central display and control unit for adjusting the identification set of said particular measuring rack.

49. The system of claim 46, wherein said central display and control unit and said measurement/control means comprise change-over means for switching to new identification sets in said first and second identification modulators/demodulators.

50. A system for measuring the unbalance of the wheels mounted on a vehicle comprising:
- a plurality of measuring racks for supporting each of the wheels of a vehicle, each of said measuring racks comprising:
- sensor means for sensing vibrations caused by the unbalance of a wheel and issuing a sensor signal responsive thereto;
- measurement/control means for generating measurement signals representative of the magnitude and direction of unbalance of the corresponding wheel in accordance with the sensor signal from the corresponding sensor;
- the sensor means and measurement/control means at each measuring rack being responsive to and controlled by control signals; and
- measuring rack transceiver means for transmitting over a wireless link said measurement signals; and central display and control unit generating said control signals for controlling the operation of said sensor means and said measurement/control means in each of said plurality of measuring racks to control the unbalance testing procedure of each measuring rack, said central display and control unit comprising:
- display means for displaying at least the magnitude of unbalance of each of the wheels at each of the measuring racks;
- control transceiver means for transmitting over a wireless link said control signals to the measuring rack transceiver means and for receiving said measurement signals transmitted by said measuring rack transceiver means; and
- wherein said central display and control unit is connected to one end of an electrical connection line, another end of said electrical connection line being connected to the control transceiver means, for communicating with said measuring rack transceiver means, whereby said control transceiver means can be located substantially level with said measuring rack transceiver means while said central display and control unit is not level with said measuring rack transceiver means.

51. The system of claim 50, wherein the measuring rack transceiver means of each of said measuring racks are arranged so that the measurement and control signals can be transmitted between measuring racks.

52. The system of claim 50, wherein each of said measuring rack transceiver means and said control transceiver means comprise infrared transmitters and infrared receivers.

53. The system of claim 50, wherein each of said measuring rack transceiver means and said control transceiver means comprise multidirectional radiation receivers and transmitters.

54. The system of claim 50, wherein each of said measuring racks comprises scanning means including a scanning transmitter and a scanning transceiver, a marking being provided on each wheel which is scanned by said scanning means for generating a speed signal representing the speed of the wheel while the wheel is being driven.

55. The system of claim 54, wherein said scanning means is located on each measuring rack opposite to a tread of the wheel, said marking being located on the tread of the wheel.

56. The system of claim 50, wherein said measurement/control means comprises a first identification modulator/demodulator and said central display and control unit comprises a second identification modulator/demodulator, said first and second identification modulator/demodulators correlating said measurement signals transmitted between said measuring racks and said central display and control unit to an identification set of a particular measuring rack.

57. The system of claim 56, wherein said first identification modulator/demodulator is adjusted to said identification set which is characteristic of a particular wheel corresponding to said particular measuring rack.

58. The system of claim 57, and further comprising a keyboard at said central display and control unit for adjusting the identification set of said particular measuring rack.

59. The system of claim 46, wherein said central display and control unit and said measurement/control means comprise change-over means for switching to new identification sets in said first and second identification modulators/demodulators.

* * * * *